Inventor:
André Maigret.

Aug. 7, 1934.   A. MAIGRET   1,968,950
COVER FOR CULINARY UTENSILS
Filed May 19, 1932   2 Sheets-Sheet 2
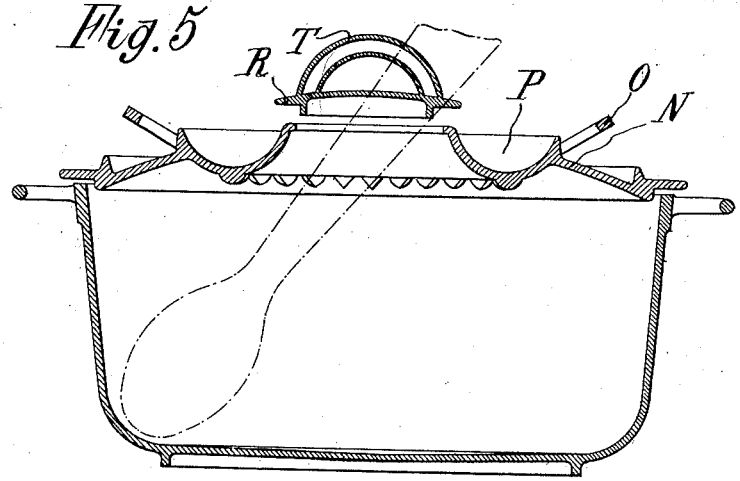
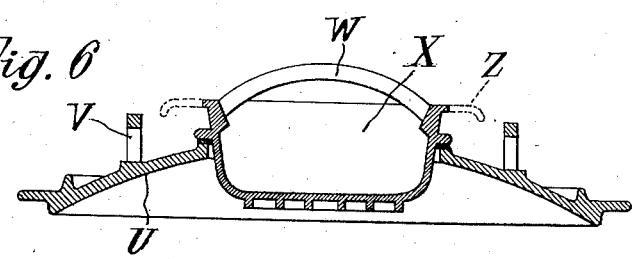
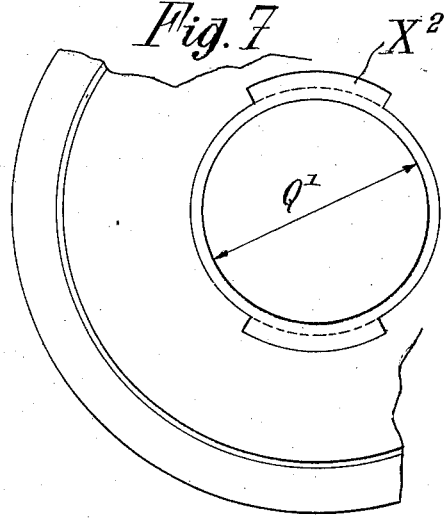
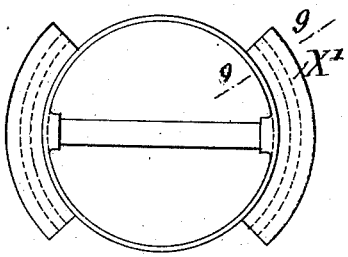
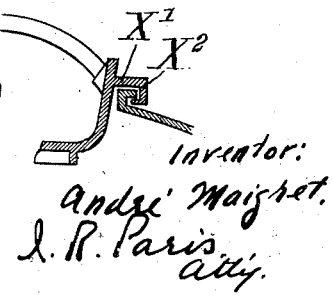

Patented Aug. 7, 1934

1,968,950

UNITED STATES PATENT OFFICE 1,968,950

COVER FOR CULINARY UTENSILS

André Maigret, Paris, France

Application May 19, 1932, Serial No. 612,334
In France July 10, 1931

4 Claims. (Cl. 53—8)

The present invention relates to covers or closures for saucepans, skillets, and like culinary utensils.

Up to the present time it has been common to make the covers of stewing pans of uniform, convex shape. The steam condensing on covers of this kind flows outwardly toward the periphery and trickles down along the walls of the pan. Inasmuch as heat being applied to the pan is concentrated generally at, or near the center thereof, the latter frequently becomes overheated and causes adhesion or even burning of the contents in contact therewith.

One of the objects of the invention is to provide a form of cover which will cause the condensed vapors to fall back into the pan at or near central portions of the latter.

Another object is to provide a form of cover which will insure conservation of the vitamins and delicate flavors present in food being cooked.

Further objects will appear in the course of the detailed description now to be given with reference to the accompanying drawings, in which:

Figure 5 illustrates, in section, an ordinary stewing pan provided with a special form of cover;

Figure 6 illustrates, in section, still another form of cover;

Figure 7 is a plan view of one of the cover elements represented in Figure 6;

Figure 8 shows, in plan, the central portion of the cover assembly designed to coact with the peripheral portion illustrated in Figure 7;

Figure 9 is a section taken on line 9—9 of Fig. 8.

Figure 1:
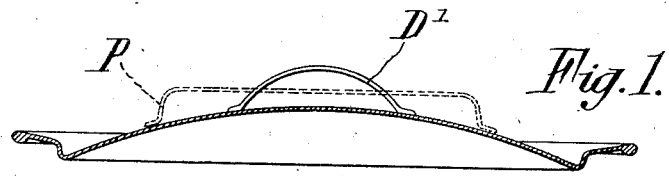
Figure 1 represents, diagrammatically, a section through one illustrative embodiment of the invention.

The invention in its simplest form is shown in Fig. 1. Here, an ordinary convex cover formed of sheet or cast iron and provided with a handle $D^1$ is fitted with a shell P adapted to contain water. Steam coming from the stewing pan and contacting with the surface of the cover cooled by the water contained in shell P condenses and drops directly back into the central portions of the pan, thus preventing the latter from becoming overheated.

The inventor is aware of the existence of covers wherein water may be deposited in a compartment located adjacent the periphery of the cover and also of covers formed so as to permit water to extend across the entire cover surface. Covers of these types, when handled, cannot be maintained sufficiently in equilibrium to prevent the water from spilling over the edges thereof. Furthermore, it is disadvantageous to produce a condensation on the entire internal surface of the cover: in this latter case, a too big proportion of steam is immediately condensed into water in the contact with the said surface, and it becomes impossible to obtain the desired concentration of the gravy.

By positioning the water container, according to the present invention, adjacent the center of the cover, all these disadvantages are avoided. The steam which tends to accumulate in the annular peripheral portion remains there uncondensed, or may also eventually escape through the interstice between the cover and the pan. It must still be said that, as the greatest part of the condensed water falls back only into the central portion of the stewing pan, where the temperature is most high, the meat cannot be overheated and does not adhere to the wall of the pan, as it very often occurs with the pans of the usual type.

Figure 2:
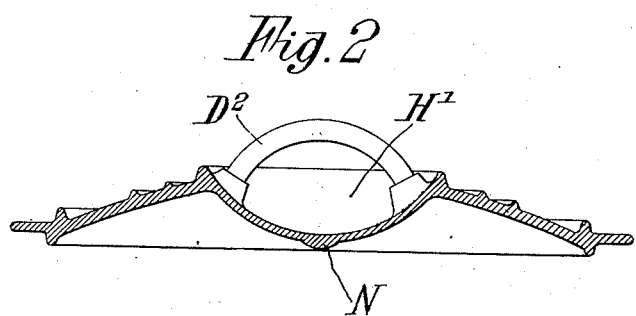
Figure 2 is a similar section through another form of cover.

Fig. 2 shows a preferred form of the invention, where the cover is designed to increase the volume of condensed water dropping backward into the central portions of the stewing pan. Here, the cover is provided with a concave central portion $H^1$ adapted to contain water, a handle $D^2$, and a button N for facilitating the dropping of the condensed water into the pan. It is obvious that the form of central container $H^1$ is such as to cause the greater part of the condensed water to fall back into the central portions of the stewing pan and to prevent local overheating.

Figure 3:
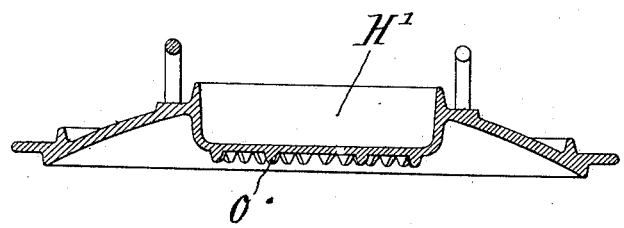
Figure 3 represents a variant of the form of cover shown on Fig. 2.

Instead of the button N, there may be provided one annular rib O (Fig. 4) or several ribs (Fig. 3). Projections can be made on these ribs, in order to facilitate the detachment of water drops.

Figure 4:
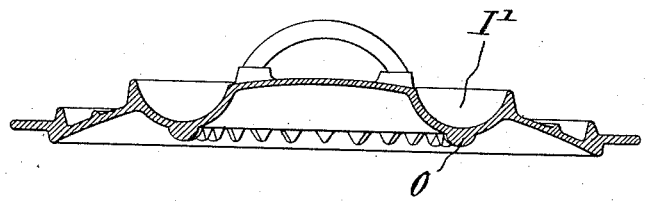
Figure 4 represents still another form of cover.

Figure 4 shows a variant of the structure represented in Fig. 2 or 3, wherein concave water recipient $H^1$ is replaced by an annular recess $I^1$ having a similar function. In both of the structures shown in Figures 2 and 4, the form of the cover should be designed so that button N and rib O lie slightly above the lower border of the cover edges, this being done to facilitate storage and shipping, the body of the cover lying entirely below its upper peripheral edge when in inverted position. Moreover, by doing so, the internal capacity of the stewing pan is not diminished by the presence of the water container provided on the cover.

The form of cover represented in Figure 5 differs from the one shown in Figure 3 only in that central cover portion R, provided with a handle T, is made detachable, thus permitting a spoon S or like implement to be inserted into the pan without disturbing the water contained in annular chamber P. This form of cover may be provided with a special pair of handles O permitting manipulation of peripheral portion N of the cover assembly.

In the form of cover illustrated in Figure 6, central cover portion R of Figure 5 is replaced by a chamber or pot X provided with a handle W and, if desired, auxiliary handles Z. Pan X not only serves to condense water onto the central portions of the stewing pan but can serve for cooking or heating as well. To prevent overheating of the upper portions of pan X, a washer formed of heat insulating material may be interposed between the pan and the cover portion and peripheral portion U of the cover assembly. This form of cover may also be provided with a second pair of handles V.

Figures 7, 8 and 9 show a form of joint adapted to be used with the form of cover assemblies represented in Figures 5 and 6. Peripheral portion U (Figure 6) is provided with a central segmental flange $X^2$ of the form shown in Figures 7 and 9 and pan X (or cover R) is provided with a segmental flange such as is shown in Figures 8 and 9. As will be obvious to those skilled in the art, the central and peripheral portions of the cover assemblies may be attached or detached from one another by a simple turning movement.

What I claim is:—

1. A solid imperforate cover for cooking vessels having a horizontal flange adapted to rest on the upper edge of the cooking vessel, an annular portion immediately adjacent said flange, said annular portion sloping upwardly and inwardly from said flange, and a central portion formed to provide a shallow open faced recess to contain cooling water, the bottom of said recess being located above the plane of the peripheral flange, whereby substantially only that portion of the steam contacting with the bottom of said recess will condense for return to the vessel.

2. A cover for cooking vessels as set forth in the preceding claim in which the shallow recess to contain cooling water is in the form of a separable container engaging with the inner edge of the annular portion.

3. A cover for cooking vessels as set forth in claim 1 in which the shallow recess to contain cooling water is annular.

4. A cover for cooking vessels as set forth in claim 1 in which the shallow recess to contain cooling water is annular and in which the portion interiorly of the annular recess is provided with a detachable portion permitting access to the interior of the vessel without disturbing the cooling water in the annular recess.

ANDRÉ MAIGRET.